United States Patent [19]

Jadrich et al.

[11] Patent Number: 4,965,632
[45] Date of Patent: Oct. 23, 1990

[54] FILM CLAMP

[75] Inventors: Bradley S. Jadrich; Edward H. Wakefield, both of Rochester, N.Y.

[73] Assignee: Eastman Kodak Company, Rochester, N.Y.

[21] Appl. No.: 442,375

[22] Filed: Nov. 28, 1989

[51] Int. Cl.$^5$ .................. G03B 27/62; G03B 27/64
[52] U.S. Cl. ...................................... 355/76
[58] Field of Search .................... 355/75, 76

[56] References Cited

U.S. PATENT DOCUMENTS

| | | | |
|---|---|---|---|
| 2,824,491 | 2/1958 | Hoffmaster | 355/75 |
| 3,132,560 | 5/1964 | Pignone et al. | 355/76 X |
| 3,944,366 | 3/1976 | Robertson | 355/76 |
| 4,444,494 | 4/1984 | Koyama et al. | 355/75 |
| 4,483,612 | 11/1984 | Binder | 355/76 |
| 4,592,652 | 6/1986 | Henmi et al. | 355/76 |
| 4,736,228 | 4/1988 | Ito | 355/75 |
| 4,761,675 | 8/1988 | Sawasaki | 355/76 |

Primary Examiner—Richard A. Wintercorn
Attorney, Agent, or Firm—Donald D. Schaper

[57] ABSTRACT

A platen 3 has a flat working surface and an aperture 5. A proximal gripping member 11 is sized, shaped, and positioned to extend along the proximal side of the aperture 5 and to grip a proximal edge of a film 1 between the platen 3 and the proximal gripping member 11. A second gripping member 13 is sized, shaped, and positioned to extend along the distal side of the aperture 5 and to grip a distal edge of the film 1 between the platen 3 and the distal gripping member 13. Arms 19 press the proximal gripping member 11 at least generally perpendicularly toward the platen 3 and press the distal gripping member 13 toward the platen 3 and away from the proximal gripping member 11 after the proximal gripping member 11 has gripped the proximal edge of the film 1 in order to pull the film flat and place the film in tension across the aperture.

12 Claims, 3 Drawing Sheets

FILM CLAMP

FIELD OF THE INVENTION

This invention pertains to a film clamp for holding a film extremely flat over an open gate aperture in a platen.

BACKGROUND OF THE INVENTION

In various types of imaging apparatus, a photographic film must be clamped in a work station while a particular operation is performed on the film. In certain types of apparatus, for example, film scanners, the film must be held extremely flat in order for an image on the film to be recorded properly. One problem in maintaining the film flat is that photographic film has a natural curl due to an emulsion coated on one side of the film.

In a conventional film clamp, as illustrated in FIGS. 1 and 2, a film 1 is clamped against a platen 3 on all four sides of a rectangular aperture 5 by a vertical force (represented by a plurality of arrows 7). In the use of such a film clamp, the natural curl in the film 1 will be retained, and the film will not be held flat. Further, when all sides of the film 1 are clamped, any thermal variation of the film that occurs while the film is clamped can result in the film's buckling.

OBJECTS OF THE INVENTION

It is a principal object of the invention to provide a film clamp which will hold film against a platen to a greater degree of flatness than do conventional film clamps.

It is another object of the invention to provide such a film clamp which is not more expensive to manufacture than conventional film clamps.

It is still another object of the invention to provide such a film clamp which is simple to manufacture and robust in use.

It is a further object of the invention to provide a film clamp which permits film to be positioned freely within the area of the film gate without the necessity of perforations or other special configurations in the film.

A still further object of the invention is to provide a film clamp which applies sufficient tension in the film to maintain the film flat during changes in temperature and humidity.

SUMMARY OF THE INVENTION

A film clamp according to the invention comprises a platen having a flat working surface and an aperture in the flat working surface which has a first side and a second side; a first gripping member sized, shaped, and positioned to extend along the first side of the aperture and to grip a film between the platen and the first gripping member; a second gripping member sized, shaped, and positioned to extend along the second side of the aperture and to grip the film between the platen and the second gripping member; first means for pressing the first gripping member at least generally perpendicularly toward the platen; and second means for pressing the second gripping member toward the platen and away from the first gripping member after the first gripping member has gripped the film, whereby first one edge of the film is held in position by the first gripping member and then the second edge of the film is pushed down on the platen and away from the first gripping member by the second gripping member.

BRIEF DESCRIPTION OF THE DRAWINGS

In FIG. 6A, the film clamp is in the film advance position. In FIG. 6B, the proximal side of the film is clamped. In FIG. 6C, both the proximal and the distal sides of the film are clamped, and the film has been tensioned.

DETAILED DESCRIPTION OF THE PREFERRED EMBODIMENT

Figure 1:
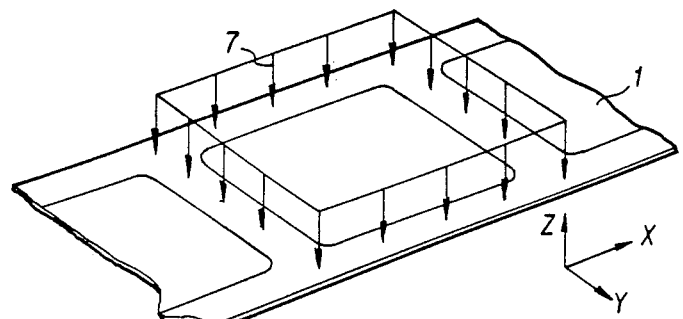
FIG. 1 is a perspective view in free body diagram form used to describe the operation of a conventional film clamp.
Figure 2:
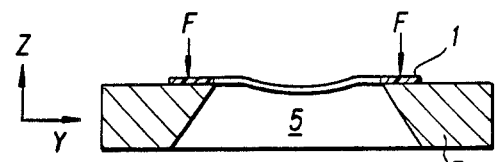
FIG. 2 is a cross-sectional view in free body diagram form used to describe the operation of a conventional film clamp.
Figure 3:
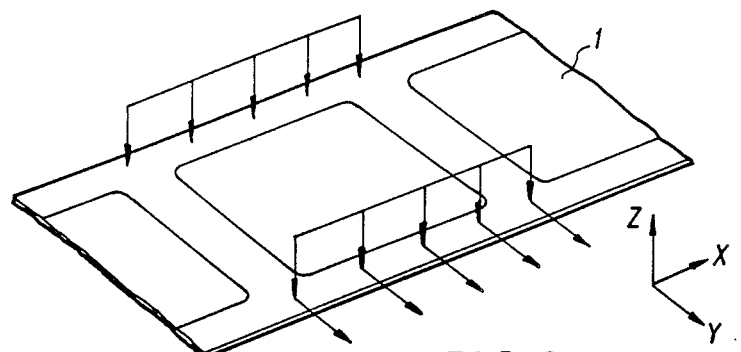
FIG. 3 is a perspective view in free body diagram form used to described the operation of a film clamp according to the invention.
Figure 4:
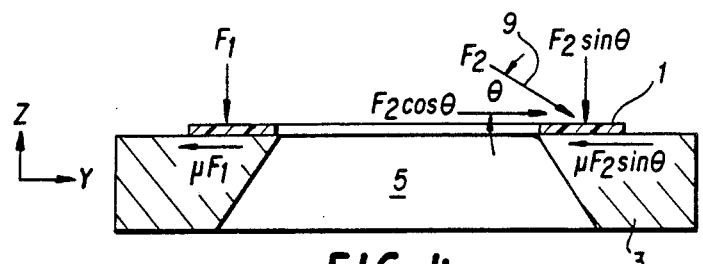
FIG. 4 is a cross-sectional view in free body diagram form used to describe the operation of a film clamp according to the invention.

FIGS. 3 and 4 illustrate in free body diagram form how a film clamp according to the invention works. Again, the number 1 represents the film, the number 3 the platen, and the number 5 a rectangular aperture in the platen 3.

Figure 5:
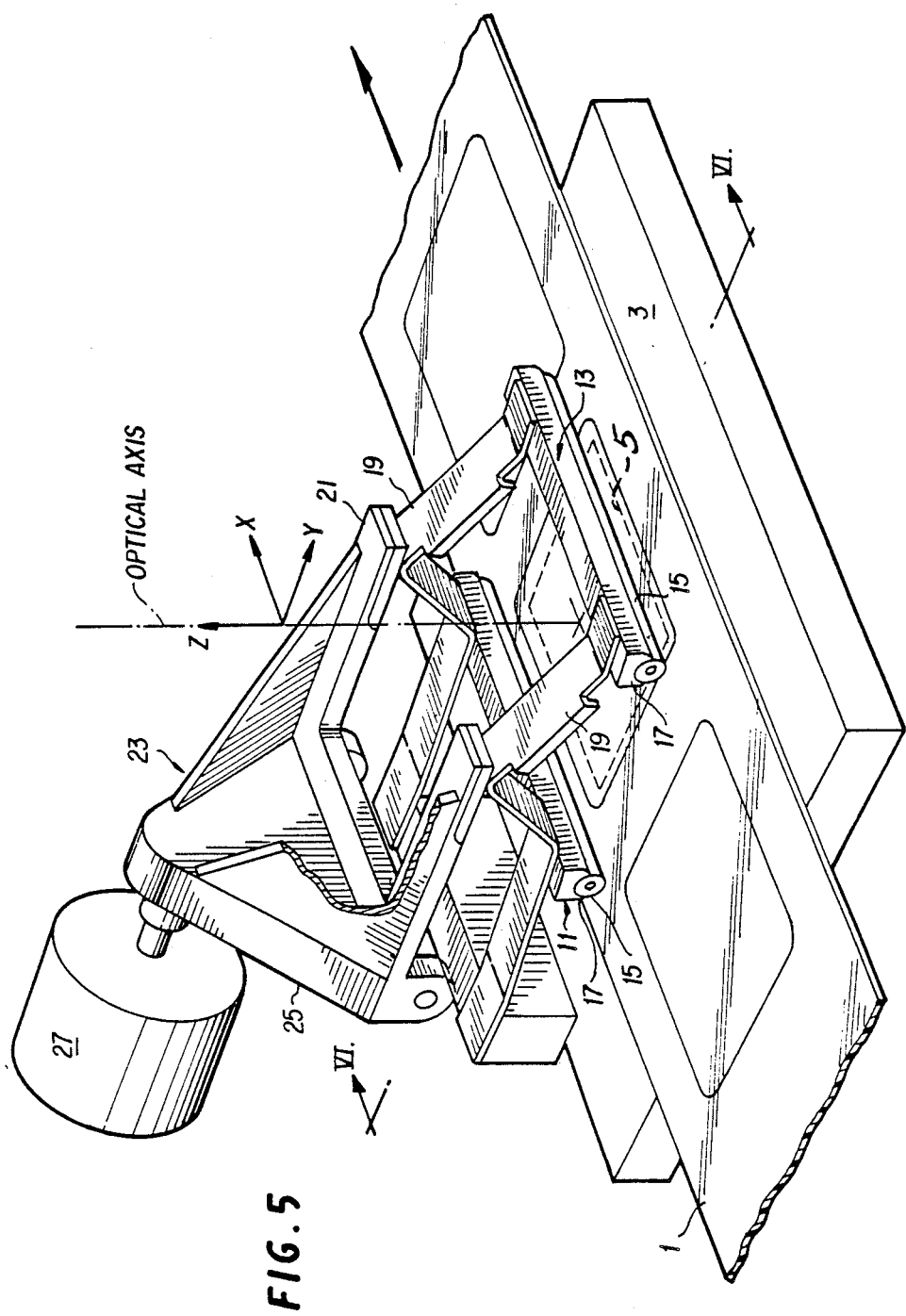
FIG. 5 is a perspective view of an embodiment of a film clamp according to the invention.

In the clamp of the present invention, (a) the gripping member that makes contact with the proximal side of the film 1 presses at least essentially vertically against the film 1, and (b) the gripping member that makes contact with the distal side of the film 1 presses both toward the platen 3 and away from the proximal gripping member as illustrated by an arrow 9 in FIG. 4. In the preferred embodiment of the present invention, there are preferably no gripping members on the lateral sides of the aperture 5, that is the sides of aperture 5 which extend between the proximal and distal sides of the film as defined herein. It will be apparent, however, that the film clamp of the present invention could operate in a position in which it is rotated 90° from the position in which it is shown in FIG. 5; in this case the gripping members would contact the film adjacent the lateral sides of the films.

Note that, if $\mu$ is the coefficient of static friction between the film 1 and the platen surface, the following relationship must be maintained:

$$F_2 \cos \theta < \mu F_1 + \mu F_2 \sin \theta.$$

Failure to meet this condition will result in slippage of the entire film 1 in the y direction when the force $F_2$ is applied.

FIGS. 5 and 6 show the presently preferred embodiment of the film clamp according to the invention. In this embodiment, there is a proximal gripping member 11 and a distal gripping member 13. Each gripping member 11, 13 comprises a cylinder 15 which, in use, makes line contact with the film 1 and a tie bar 17 which mounts the cylinder 15. Each gripping member 11, 13 is mounted on two arms 19. The arms 19 are preferably intrinsically resilient, and they can, for instance, be made of beryllium copper. Alternatively, the arms 19 can be non-resilient but pivotally mounted at their proximal ends and biased away from the platen 3.

Each arm 19 can be pressed toward the platen 3 by a corresponding finger 21 of a bell crank 23. A third finger 25 of the bell crank 23 can be pivoted toward the platen 3 by an actuator 27, which can be a solenoid, an air cylinder, or a similar device. If the arms 19 are resilient, their intrinsic resiliency returns them to the position shown in FIG. 6A when the actuator 27 does not bear against the third finger 25. If the arms 19 are not resilient, a biasing means of some kind must be attached to the arms 19 to return them to the position shown in FIG. 6A when the actuator 27 does not bear against the third finger 25.

Figure 6A:
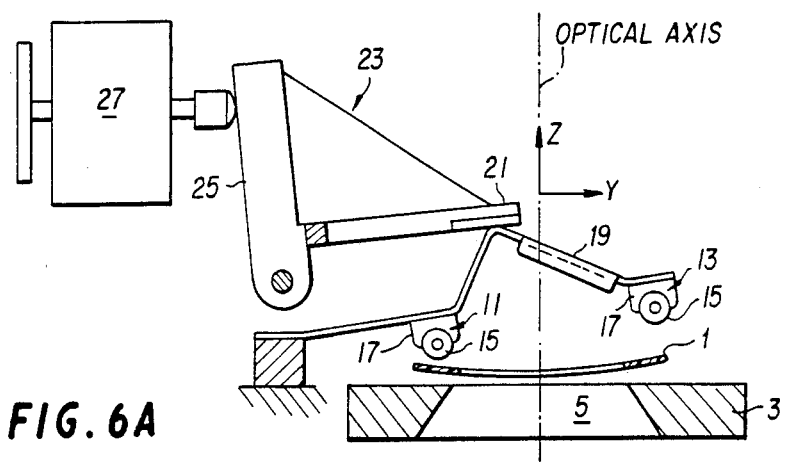
FIG. 6A–6C are cross-sectional views on the plane VI—VI in FIG. 5.
Figure 6B:
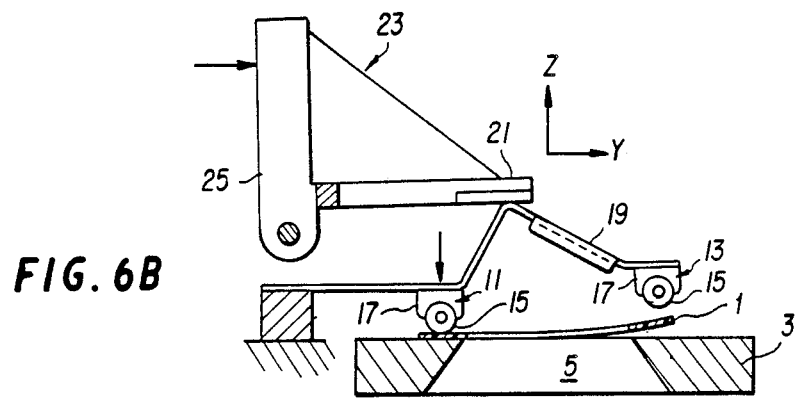
Figure 6C:
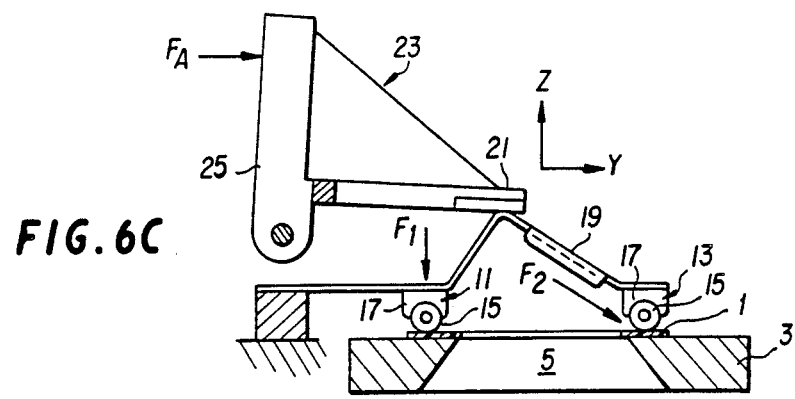

As best seen in FIG. 6A-6C, the arms 19 are preferably sized, shaped, and positioned so that, when the fingers 21 are pivoted toward the platen 3 by the actuator 27, the proximal gripping member 11 contacts the film 1 first, bearing at least essentially vertically against the proximal edge of the film 1 and forcing it toward the platen 3, after which the distal gripping member 13 contacts the film 1, pressing the distal edge of the film 1 both toward the platen 3 and away from the proximal gripping member 11 to place the film in tension.

Of course, it is not essential to the invention that the distal and proximal gripping members be mounted on the same arms. However, the arrangement shown in the drawings has been found to be simple to manufacture and robust in use. Moreover, measurements to date using the device shown in FIGS. 5 and 6 have shown that the film flatness is held to 0.0010 inches–0.0015 inches over a standard 35 mm image area, in contrast to a flatness of 0.004 inches–0.006 inches over a similar area provided by a conventional four-sided film clamp. Similar improvements in film flatness can be obtained in other sizes of film.

Obviously, numerous modifications and variations of the present invention are possible in light of the above teachings. It is therefore to be understood that, within the scope of the appended claims, the invention may be practiced otherwise than as specifically described herein.

We claim:

1. A film clamp comprises:
    (a) a platen having:
        (i) a flat working surface and
        (ii) an aperture in said flat working surface, said aperture having a first side and a second side;
    (b) a first gripping member sized, shaped, and positioned to extend along said first side of said aperture and to grip a film between said platen and said first gripping member;
    (c) a second gripping member sized, shaped, and positioned to extend along said second side of said aperture and to grip the film between said platen and said second gripping member;
    (d) first means for pressing said first gripping member at least generally perpendicularly toward said platen; and
    (e) second means for pressing said second gripping member:
        (i) toward said platen and away from said first gripping member and
        (ii) after said first gripping member has gripped the film,
        whereby first one edge of the film is held in position by said first gripping member and then a second edge of the film is pushed down on said platen and away from said first gripping member.

2. A film clamp as recited in claim 1 wherein said first and second means press said first and second gripping member resiliently toward said platen.

3. A film clamp as recited in claim 2 wherein said first and second means comprise an arm to which each of said first and second gripping members is attached.

4. A film clamp as recited in claim 3 wherein said arm is made out of beryllium copper.

5. A film clamp as recited in claim 2 wherein said first and second means comprise two arms, each of said first and second gripping members being attached to both of said two arms.

6. A film clamp as recited in claim 1 wherein said first and second means comprise an arm to which each of said first and second gripping members is attached.

7. A film clamp as recited in claim 1 wherein said first and second means comprise two arms, each of said first and second gripping members being attached to both of said two arms.

8. A film clamp as recited in claim 1 wherein said first and second gripping members are cylindrical in shape, whereby, in use, said first and second gripping members make line contact with the film.

9. A film clamp as recited in claim 1 wherein:
    (a) said first and second means comprise two arms, each of said first and second gripping members being attached to both of said two arms, and
    (b) said first and second means further comprise third means for pressing against said two arms.

10. A film clamp as recited in claim 9 wherein:
    (a) said third means comprises a bell crank having two first fingers, one of which bears against each one of said two arms, and a second finger, and
    (b) said first and second means further comprises an actuator that bears against said second finger of said bell crank.

11. A film clamp as recited in claim 9 wherein each of said two arms is resilient.

12. A film clamp as recited in claim 11 wherein each of said two arms is made out of beryllium copper.

* * * * *